United States Patent [19]

Tseng

[11] Patent Number: 5,385,070
[45] Date of Patent: Jan. 31, 1995

[54] BRAKE HANDLE

[76] Inventor: Shih-Ming Tseng, No. 18-12, Lane 503, Sec. 2, Chung Cheng Road, Changhua, Taiwan, Prov. of China

[21] Appl. No.: 87,101

[22] Filed: Jul. 1, 1993

[51] Int. Cl.⁶ ............................ F16C 1/10; G05G 11/00
[52] U.S. Cl. ...................... 74/502.2; 74/489; 74/527; 74/528
[58] Field of Search ............ 74/502.2, 489, 527, 74/529, 528

[56] References Cited

U.S. PATENT DOCUMENTS

| 4,704,044 | 11/1987 | Yoshigai | 74/502.2 |
| 4,899,610 | 2/1990 | Bourret | 74/526 X |
| 4,903,799 | 2/1990 | Romano | 74/483 X |
| 4,916,967 | 4/1990 | Nakamura | 74/502.2 |
| 5,078,023 | 1/1992 | Scarborough | 74/489 X |
| 5,279,179 | 1/1994 | Yoshigai | 74/483 X |
| 5,287,765 | 2/1994 | Scura | 74/502.2 |

FOREIGN PATENT DOCUMENTS

| 0435248 | 7/1991 | European Pat. Off. | 74/502.2 |
| 1210326 | 3/1960 | France | 74/502.2 |
| 1326831 | 4/1963 | France | 74/502.2 |

Primary Examiner—Vinh T. Luong
Attorney, Agent, or Firm—Beveridge, DeGrandi, Weilacher & Young

[57] ABSTRACT

The two-staged brake handle includes two axle bushes, a brake handle and a positioning stand. Two bolts are screwed on the axle bushes, respectively. The positioning stand has an axle center hole wherein an arc gutter is provided around the rim for matching the protuberant rim of the two rotating axle bushes. The top rotating axle bush has a penetrating hole and a bolt hole, and the bottom rotating axle bush has a penetrating hole and a round hole in the corresponding positions. An arc hole and a round hole are provided in the front part of the brake handle. Two bolts are respectively inserted into the positioning stand to interlock into the penetrating holes and bolt hole of the top and bottom rotating axle bushes. A twisting spring is installed in the space between the bolt in the arc hole and the bottom axle bush. Two end hooks of the spring are fixed in the bottom of the positioning stand and against a nut.

8 Claims, 3 Drawing Sheets

BRAKE HANDLE

BACKGROUND OF THE INVENTION

1. Field of the Invention

The present invention relates to an improved brake handle. Two rotating axle bushes are installed in the top and bottom of the axle center hole where the brake handle is connected with the positioning stand. Two bolts are screwed in the axle bushes respectively. The positioning stand has an axle center hole wherein an arc gutter is provided around the rim of the axle center hole for matching the protuberant rim of the two rotating axle bushes so that the rotating axle bushes can move smoothly. The top axle bush has a penetrating hole and a bolt hole, and the bottom rotating axle bush has a penetrating hole and a round the hole in the corresponding positions. An arc hole and a round hole are provided in the front part of the brake handle for adapting to the change of the axle center. The bolts are respectively inserted into the positioning stand to interlock into the penetrating holes and bolt hole of the top and bottom rotating axle bushes. A twisting spring is installed in the space between the bolt through the arc hole and the bottom axle bush. The spring has its two end hooks fixed in the bottom of the positioning stand and against a nut. When the brake handle is clutched, it will rotate around the axle center, i.e., the bolt in the round hole of the front part of the brake handle, and move the bolt in the arc hole inward to the rim so as to make the center point of the axle bushes the new axle center. The axle bushes will rotate around the new axle center. Therefore, the round hole will lose its position of being the axle center temporarily while adapting to the clutching action of human fingers so that the bicycle can be braked by the two-staged brake. The twisting spring will rebound the brake handle back so as to brake the bicycle safely and save energy.

2. Description of the Prior Art

The prior art brake handle is comprised of a brake handle and a positioning stand, wherein the brake handle is linked up with the positioning stand at a fixed axle point. When riders want to brake their bicycle, they have to keep pressing on the brake handle to drive the rubber brake blocks, thereby stopping the bicycle. However, this braking action would not allow them time to control the direction of the handle bar. This phenomenon would be a potential threat against the safety of the bicycle rider, which threat has been neglected by the rider and the manufacturer for a long time. Therefore, the inventor of the improved brake handle of the present invention had been endeavoring for many years to discover a braking system which eliminates the aforesaid drawback.

SUMMARY OF THE INVENTION

It is therefore the main object of the present invention to provide an improved brake handle which is connected with a positioning stand in the axle center hole, wherein an adequate arc gutter is provided around the rim. The top rotating axle bush has a penetrating hole and a bolt hole, and the bottom rotating axle bush has a penetrating hole and a round hole in the corresponding positions. An arc hole and a round hole are provided in the front part of the brake handle for adapting to the change of the axle center. Two bolts are respectively inserted into the positioning stand to interlock into the penetrating holes and the bolt hole of the top and bottom rotating axle bushes. A twisting spring is installed in the space between the bolt through the arc hole and the bottom axle bush, and the spring has its two end hooks fixed. When the brake handle is clutched, it will rotate around the axle center, i.e., the bolt in the round hole at the front part of the brake handle, and move the bolt in the arc hole inward to the rim so as to make the center point of the axle bushes the new axle center, wherein the axle bushes will rotate around the new axle center. Therefore, the round hole will lose its position of being the axle center temporarily while adapting to the clutching action of human fingers so that the bicycle can be braked by the two-staged brake. The twisting spring will rebound the brake handle so as to brake the bicycle safely and save energy.

It is a secondary object of the present invention to provide an improved brake handle whose axle center is changeable to adapt to the structure of a finger. Such a two-staged brake handle fits in with the needs of the human body.

It is another object of the present invention to provide an improved brake handle wherein the protuberant rim of the rotating axle bushes are smaller than the arc gutter so that the brake handle can be controlled appropriately.

It is still another object of the present invention to provide an improved two-staged brake handle which can brake the bicycle easily, smoothly and safely.

It is another object of the present invention to provide an improved brake handle wherein a twisting spring is installed in the space between the bolt through the arc hole and the bottom axle bush to rebound the brake handle, so as to prevent the brake clamp from abrading.

BRIEF DESCRIPTION OF THE DRAWINGS

FIG. 3 is an assembly schematic view of an improved brake handle of the present invention from the back.

DETAILED DESCRIPTION OF THE PREFERRED EMBODIMENTS

Figure 1:
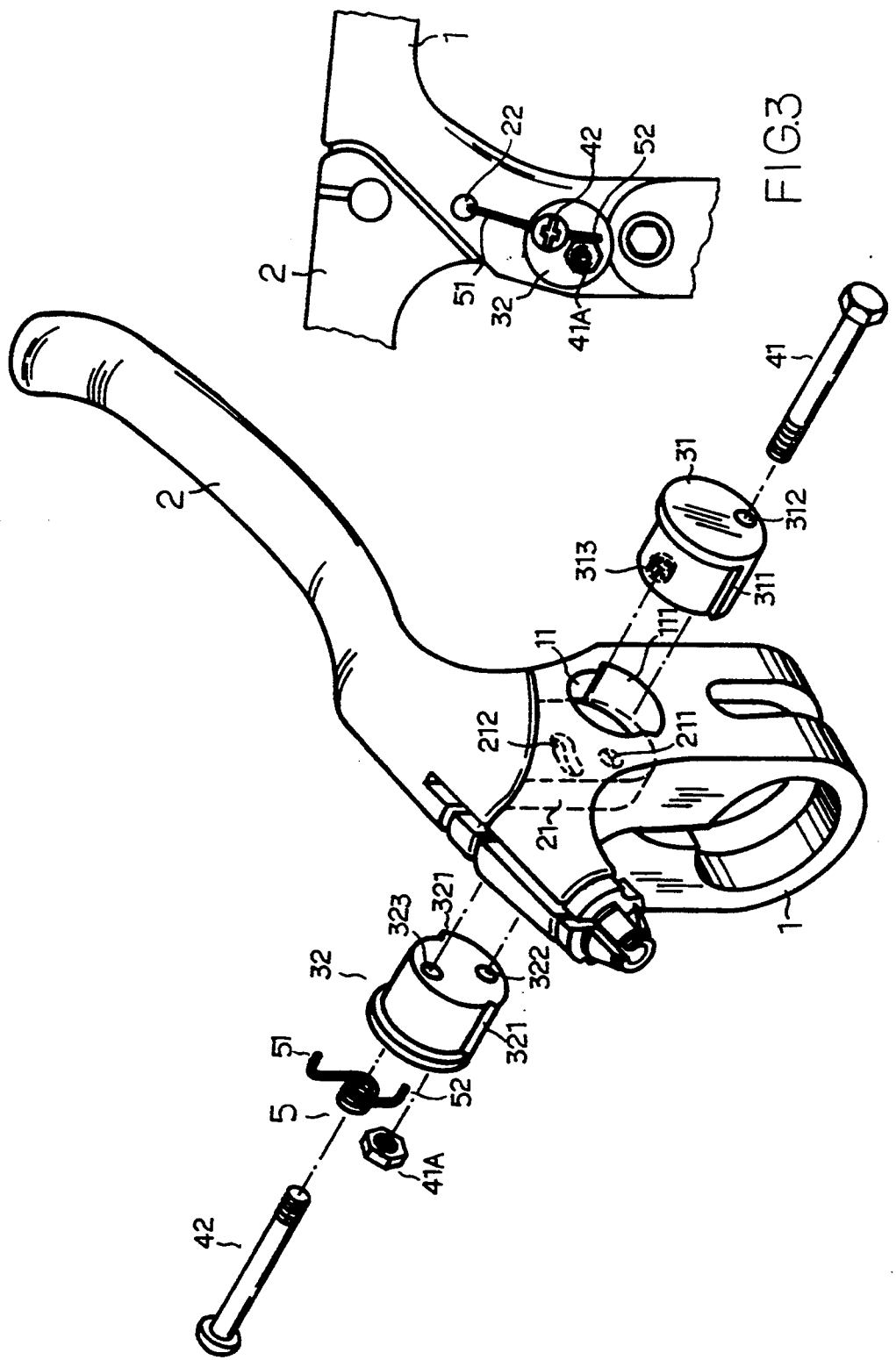
FIG. 1 is a three-dimensional exploded view of an improved brake handle of the present invention.
Figure 2:
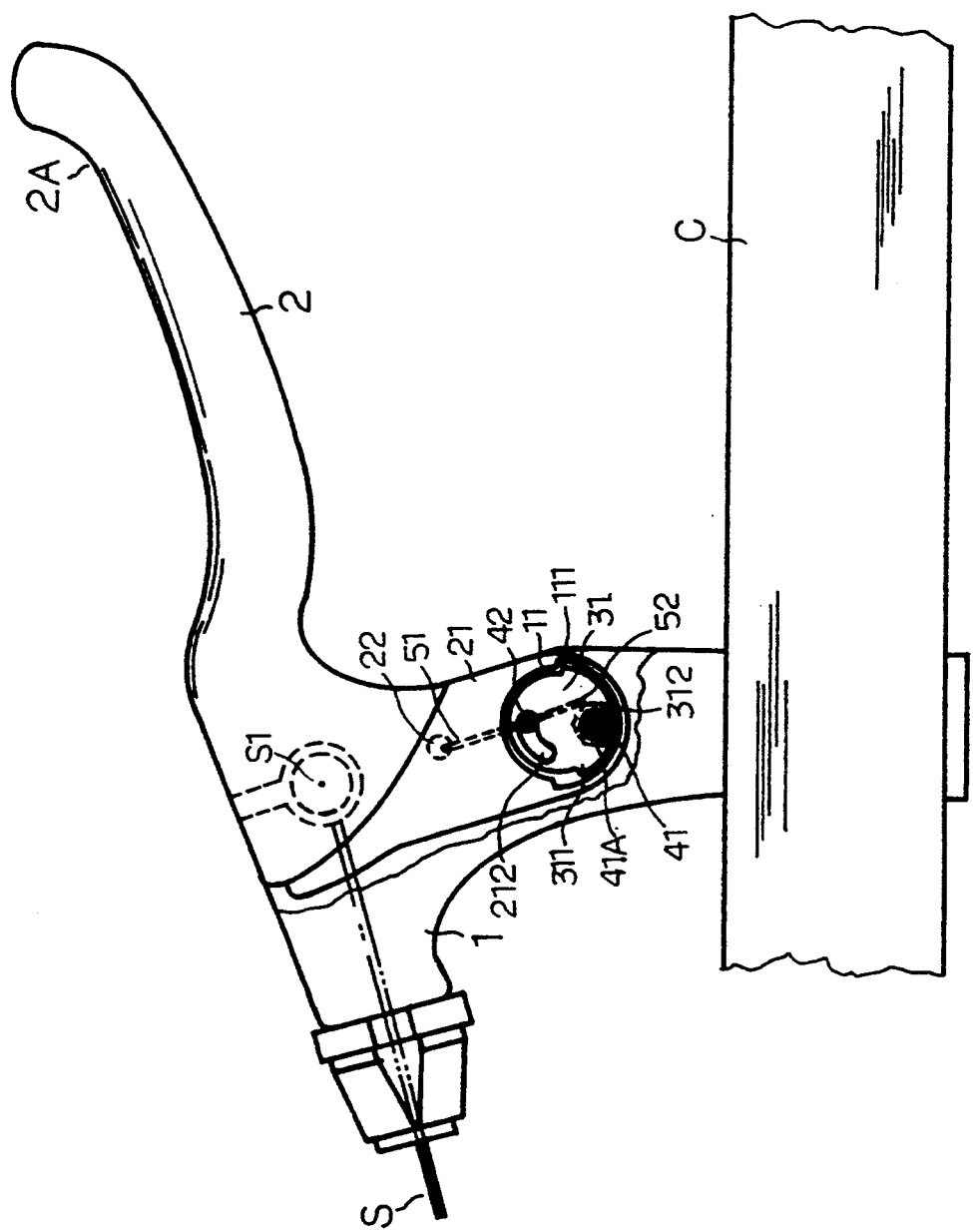
FIG. 2 is an assembly schematic view of an improved brake handle of the present invention from the front.
Figure 4:
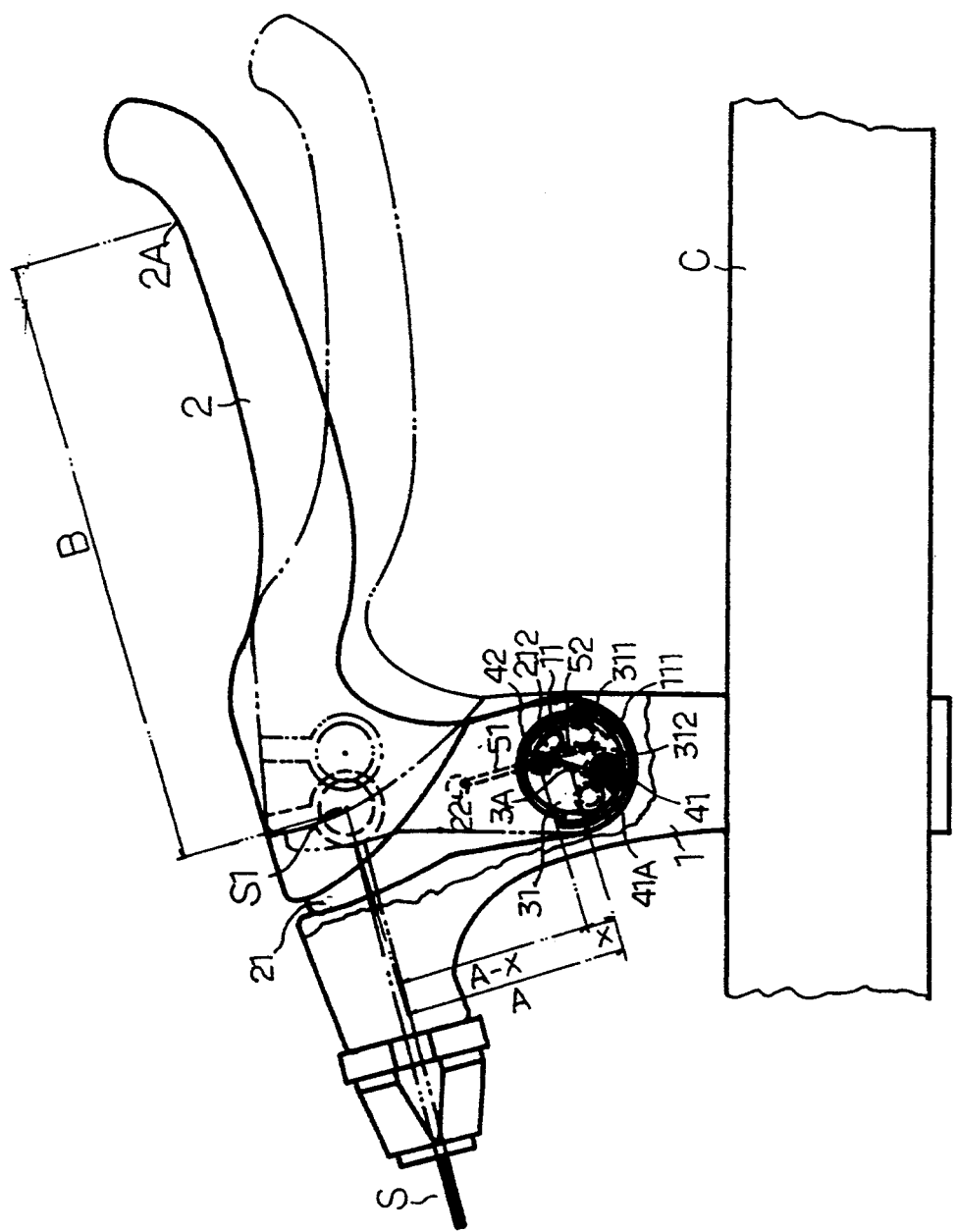
FIG. 4 is a schematic view of the two-staged brake handle showing the movement of the brake handle in use.

Referring to FIG. 1, an improved brake handle comprised of a positioning stand 1, a brake handle 2 (including a handle lever), a pair of rotating axle bushes 31, 32 and two bolts 41, 42. The positioning stand 1 has an axle center hole 11 wherein an arc gutter 111 is provided to match the protuberant rims 311, 321 of the top and bottom axle bushes 31, 32. The top rotating axle bush 31 has a penetrating hole 312 and a bolt hole 313, and the bottom rotating axle bush 32 has a penetrating hole 322 and a round hole 323 in the corresponding positions. An arc hole 212 and a round hole 211 are provided in the front part 21 of the brake handle 2 to adapt to the change of the axle center. The bolt 41 is inserted into the positioning stand 1 and through the round hole 211 of the brake handle 2 through the penetrating holes 312, 322, of the top and bottom axle bushes 31, 32. Similarly, bolt 42 is inserted into the positioning stand 1 and through the arc hole 212 of the brake handle 2 through the round hole 323 and interlocked into the bolt hole 313. (See also FIG. 2.) A twisting spring 5 is installed in the space between the bolt 42 through the arc hole 212 and the bottom axle bush 32. Two end hooks 51, 52 of the spring 5 are fixed in the bottom hole 22 of the positioning stand 1 and against the nut 41A of the bolt 41. (Referring to FIG. 3.) When the brake handle 2 is clutched, it will rotate around the axle center, i.e., the bolt 41 in the round hole 211, and move the bolt 42 in the arc hole 212 relatively inward to the rim of the arc hole 212. The above process is the first stage of the braking. (At this time, the axle bushes 31, 32 and twisting spring 5 are motionless.) Referring to FIG. 4, the center point 3A of the axle bushes 31, 32 will become the new axle center soon afterward, and thereafter, the axle bushes will rotate around the new axle center. Therefore, the round hole 211 will lose its position of being the axle center temporarily. At this time, the twisting spring 5 will follow the movement of the axle bushes 31, 32. The process described above is the second stage of braking. The distance between the axle point S1 of the brake line S and the top 2A of the handle is fixed, which also means that the distance B in FIG. 4 is fixed. The distances between the axle point S1 of the brake line S and axle points 211, 212 are A and A-X, respectively. B/A<B/A-X indicates the output power of the first and second stages of braking. According to the aforementioned equation, a bicyclist can find that the first stage of braking slows down the speed, and the second stage completely brakes the bicycle while using lesser force. The twisting spring 5 will soon afterward rebound the brake handle so as to prevent the brake clamp from abrading. The improved two-staged brake handle of the present invention is adapted to the structure of a finger so that a bicyclist can brake the bicycle effectively, smoothly and safely.

I claim:

1. A brake handle apparatus, comprising:
   a positioning stand defining an axle center hole including an arc gutter at a portion of a rim of the axle center hole,
   a brake handle including a front part received within said positioning stand, said front part having an arc hole and a first round hole defined therein;
   an upper rotating axle bush inserted in a first end of the axle center hole, the upper rotating axle bush having a first penetrating hole, a bolt hole, and a first protuberant rim which rests inside the arc gutter;
   a bottom rotating axle bush inserted in an opposite end of the axle center hole, the bottom rotating axle bush having a second penetrating hole, a second round hole, and a second protuberant rim which rests inside the arc gutter;
   a first bolt passing through the first penetrating hole of the upper rotating axle bush, the first round hole of the front part of the brake handle, and the second penetrating hole of the bottom rotating axle bush; and
   a second bolt passing through the second round hole of the bottom rotating axle bush and the arc hole of the front part of the brake handle, and into the bolt hole of the upper rotating axle bush.

2. The brake handle apparatus of claim 1, wherein the brake handle includes a handle lever which extends from the front part.

3. The brake handle apparatus of claim 2, further including a twisting spring mounted between a top portion of said second bolt and the bottom rotating axle bush such that the spring returns the brake handle to an original position after use of the brake handle apparatus is completed.

4. The brake handle apparatus of claim 3, wherein the twisting spring includes an end hook fixed to the positioning stand.

5. The brake handle apparatus of claim 3, wherein the twisting spring includes an end hook fixed against a nut attached to an end of said first bolt.

6. The brake handle apparatus of claim 1, further including a twisting spring mounted between a top portion of said second bolt and the bottom rotating axle bush such that the spring returns the brake handle to an original position after use of the brake handle apparatus is completed.

7. The brake handle apparatus of claim 7, wherein the twisting spring includes an end hook fixed to the positioning stand.

8. The brake handle apparatus of claim 7, wherein the twisting spring includes an end hook fixed against a nut attached to an end of said first bolt.

* * * * *